Oct. 31, 1933.  J. W. GREER ET AL  1,932,930
CONFECTIONERY DIPPING PROCESS AND APPARATUS
Filed June 3, 1930  3 Sheets-Sheet 1

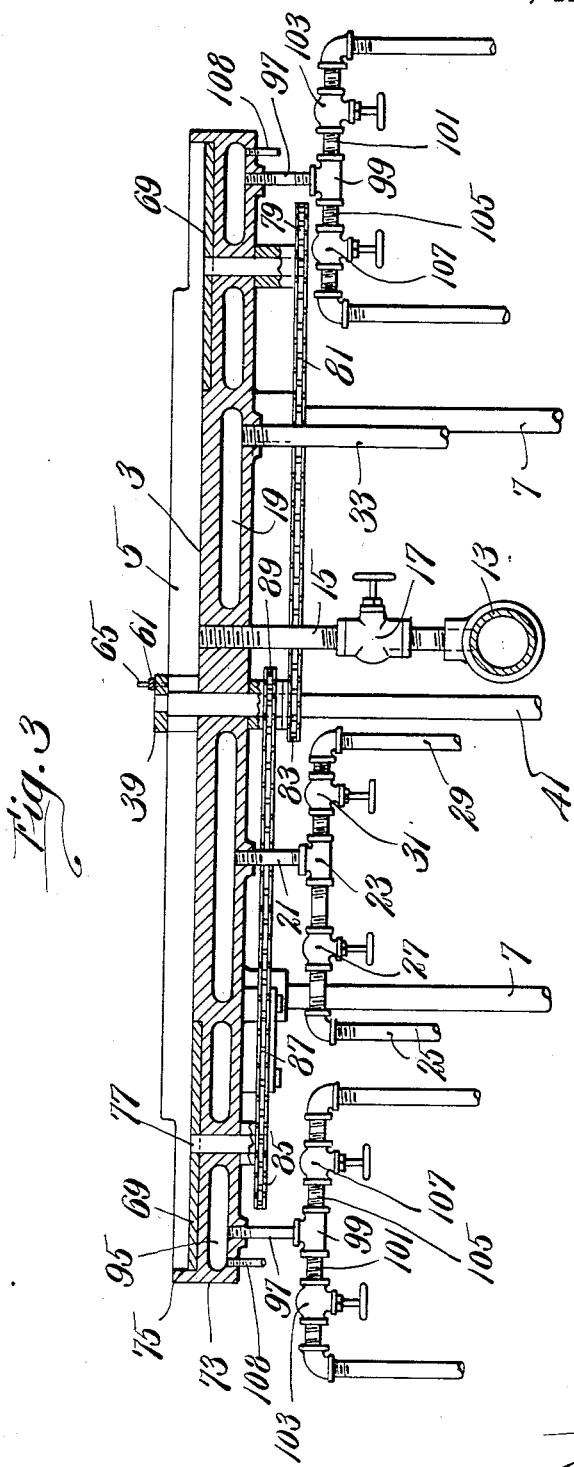

Oct. 31, 1933.                J. W. GREER ET AL                1,932,930
               CONFECTIONERY DIPPING PROCESS AND APPARATUS
                         Filed June 3, 1930          3 Sheets-Sheet 3
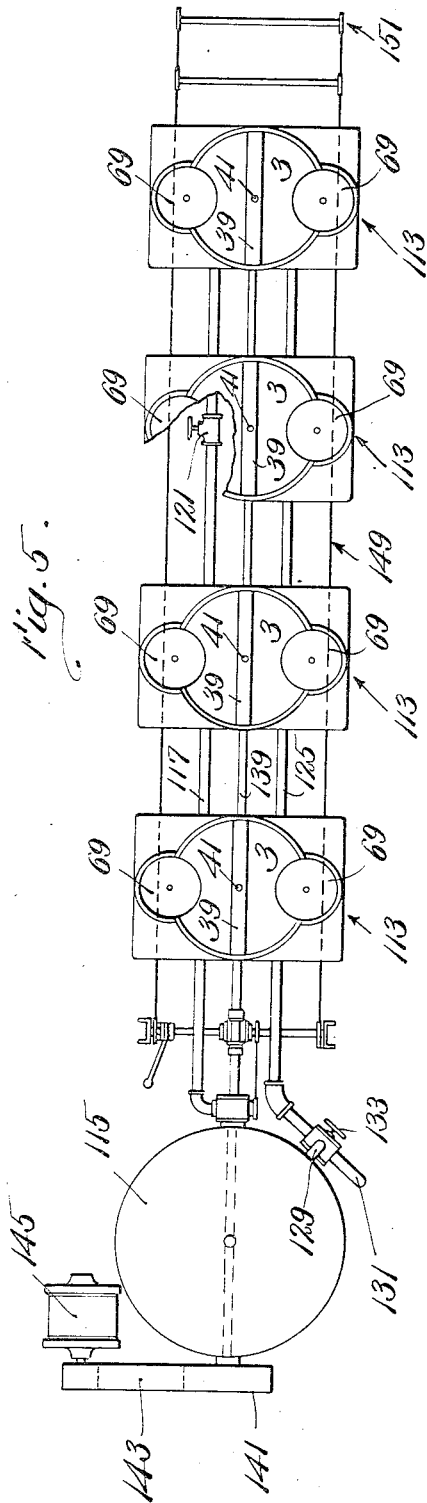
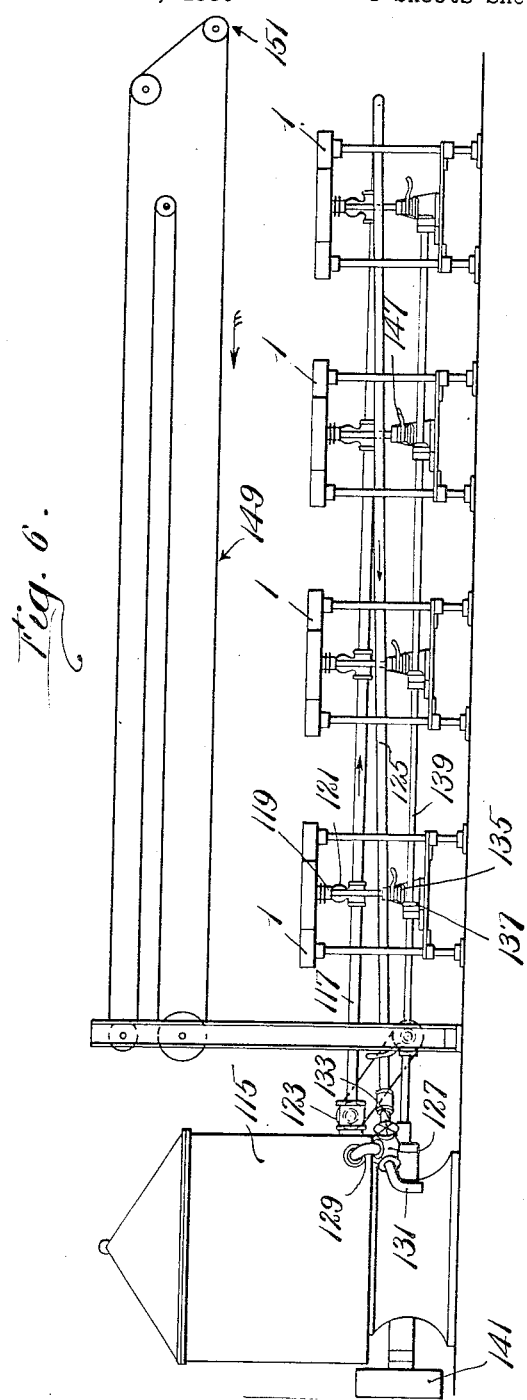
Inventors:
Jesse W. Greer
Fred W. Greer
by Henry T. Williams
Att'y.

Patented Oct. 31, 1933

1,932,930

UNITED STATES PATENT OFFICE 1,932,930

CONFECTIONERY DIPPING PROCESS AND APPARATUS

Jesse W. Greer, Cambridge, and Fred W. Greer, Belmont, Mass.

Application June 3, 1930. Serial No. 459,038

12 Claims. (Cl. 91—4)

The invention to be hereinafter described relates to a process and apparatus for use in hand dipping confectionery centers.

Heretofore the apparatus generally used in hand dipping centers in chocolate has comprised an ordinary table having an opening to receive a tank with its top flush with the upper surface of the table, the latter being sufficiently large to provide a shelf between the tank and an edge of the table.

The hot chocolate at a temperature of about 95° F. is usually carried by hand and poured 'nto the tank which ordinarily holds about thirty pounds. The hand dipper dips four or five handfulls of chocolate from the tank and deposits the same upon the shelf. The chocolate at said temperature is too warm for dipping candy centers, and therefore the hand dipper beats, stirs and works the chocolate back and forth over the table until the air and the table have cooled and tempered it to a temperature sufficiently low for dipping, which may be about 85° F.

When the chocolate has been tempered, the hand dipper drops and stirs the candy centers therein to coat them with chocolate. A tray or plaque with a glazed sheet of paper thereon is brought to the dipper who places the coated centers on the tray to cool and harden. This process is repeated until the supply of chocolate on the table is so depleted that it is difficult to coat the centers. Then the dipping operation ceases, and more chocolate is dipped from the tank, placed upon the table and tempered, and additional centers are dipped as before. After this process has continued for a few hours, a crust of from one to ten pounds of chocolate forms on the table around the dipping space, due to the cooling effect of the air and the table. This crust is scraped from the table and put into a kettle to re-melt, and then is available for dipping. The melting of the crust requires two or three hours, and is an expensive operation, due not only to the labor involved, but to a certain amount of scrap which it is impossible to eliminate. The steps above described constitute essentially a hand process.

One object of the present invention is to provide a process and apparatus for hand dipping confectionery centers which will very materially reduce the time, labor and cost thereof, and with economy in the amount of chocolate used. In the practice of the process the hot liquid chocolate is conducted to a cooled surface where it is stirred and mixed to eliminate bubbles therefrom and to temper the same. The chocolate is fed across this surface and delivered to one or more hand dipping stations in proper amount to enable the continuous dipping of the centers. The chocolate is not only fed continuously to the stations, but some of the chocolate is continuously removed from the stations so that it does not remain at said stations sufficiently long to form the crust referred to.

Another purpose of the invention is to cool the chocolate to a temperature somewhat beneath that proper for dipping, and then to raise the temperature to the proper temperature for dipping. This will result in an improved coating with a high gloss surface.

The surface on which the hot liquid chocolate is stirred, mixed and tempered, should be cleaned at the end of each day's operation. The apparatus of the present invention is such that this surface may be easily and readily heated to melt any residual chocolate thereon and facilitate removal therefrom.

Another purpose of the invention is to provide a main supply kettle and to conduct hot liquid chocolate therefrom to a series of tempering and hand dipping stations, the arrangement being such that the supply of chocolate to these stations may be easily controlled. Also, adjacent and common to the series of stations, a conveyer may be provided which will carry the empty glazed paper covered trays to the stations, and carry the filled trays from the stations.

With the aforesaid and other purposes in view, the character of the invention may be best understood by reference to the following description of the process, and apparatus shown in the accompanying drawings, wherein:

Fig. 3 is a vertical section through the station;

Figure 1:
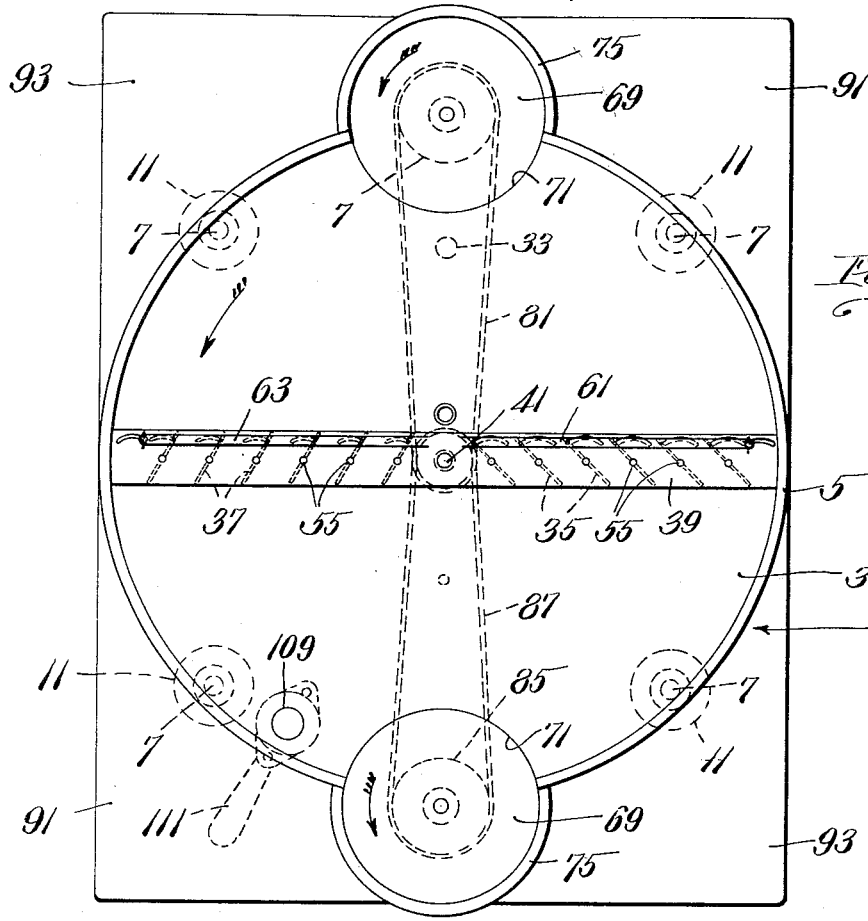
Fig. 1 is a plan of one of the chocolate tempering and hand dipping stations.
Figure 2:
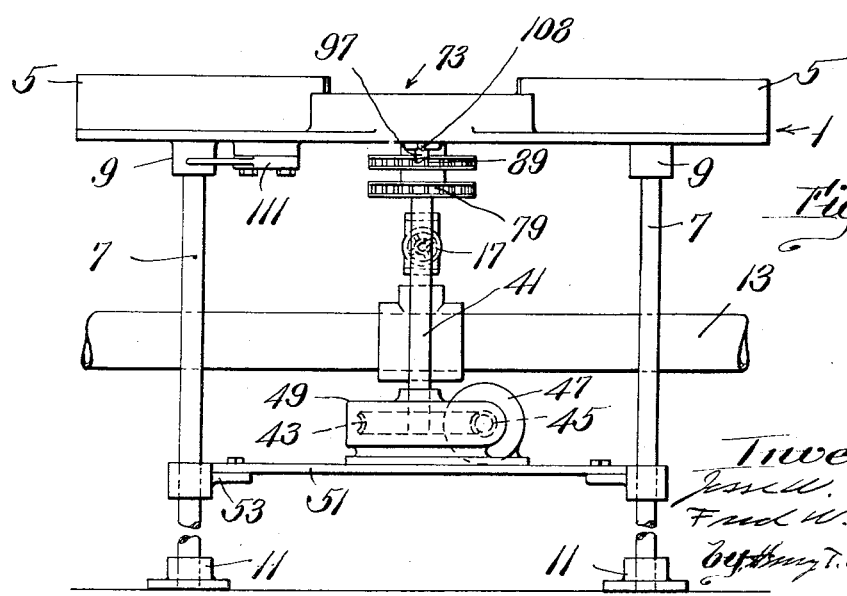
Fig. 2 is a side elevation of the station shown in Fig. 1.

Fig. 4 on an enlarged scale is a plan of the bar carrying the stirrers;

Fig. 5 is a plan of a series of tempering and dipping stations and apparatus associated therewith, the location of the conveyer being indicated in broken lines; and Fig. 6 is a side elevation of the apparatus shown in Fig. 5.

Referring to the drawings, 1 designates a table having a flat circular surface 3 and a rim or flange 5 surrounding the same. This table may have any suitable support, in the present instance, in the form of four posts 7 having their upper ends entered into bosses 9 at the under side of the table, and having their lower ends set in feet 11 resting on the floor.

Hot liquid chocolate may be conducted to the surface of the table from a kettle through a main pipe 13, and a branch pipe 15 extending from the main pipe up through the table, said branch pipe being provided with a valve 17 for regulating the supply of chocolate to the table.

It is desirable to supply the chocolate to the table at a temperature considerably higher than that suitable for dipping, since chocolate which is tempered from a higher temperature, such, for example, as 100° F. down to 85° F., will have a better gloss than if tempered from 90° or 92° to 85° F. To temper the chocolate on the table, it is provided with a jacket 19 beneath the table through which the water or other cooling fluid is circulated. As stated, at the end of the day's operation the surface is heated in order to melt residual chocolate thereon and facilitate removal therefrom. To accomplish this, steam is supplied to the jacket. To conduct water or steam to the jacket, a pipe 21 is provided communicating with the jacket and with a T-union 23. A water pipe 25 is connected to this union, and is provided with a valve 27, and a steam pipe 29 is connected to the union and provided with a valve 31. When it is desired to conduct water to the jacket, the valve 27 is opened and the valve 31 is closed. On the other hand, when it is desired to conduct steam to the jacket, the valve 27 is closed and the valve 31 is opened. The water or steam may leave the jacket through a discharge pipe 33.

Suitable means may be provided for stirring, mixing and tempering the hot liquid chocolate on the table. In the present embodiment of the invention, this means comprises a series of plows in the form of scrapers or stirrers 35, and a series of such plows 37 carried by and depending from a carrier or bar 39 fast on the upper end of a shaft 41 which projects up through a central bearing in the table. The lower end of this shaft has a worm gear 43 thereon meshing with a worm 45 driven by an electric motor 47. The gear and worm are enclosed in a casing 49, and the latter and the motor are mounted on a spider 51 supported on brackets 53 on the table supporting posts 7 referred to.

It is desirable that the scrapers shall be adjustable to vary their angularity for purposes to be described. To this end each scraper has a pintle 55 projecting up from the top thereof and through a hole in the carrier bar. Each scraper also has a pin 57 projecting up through an arcuate slot 59 in the bar. The pins of the series of scrapers 35 are connected to a slide 61, and the pins of the series of scrapers 37 are connected to a slide 63. Adjustment of these slides longitudinally of the bar will vary the angularity of the scrapers. To secure the slides in their positions of adjustment, they are provided at their outer ends with bolts 65 having wing nuts, the shanks of the bolts being entered through arcuate slots 67 in the bar. The scrapers may be set so that they all tend to feed the chocolate outwardly or inwardly relatively to the center of the table, or one series may be set to feed outwardly, and the other set to feed inwardly. Further, their angularity may be varied to regulate the speed of feed outwardly or inwardly.

Each table may have associated therewith one or more hand dipping stations, and in the present instance two are shown diametrically opposite to each other and in the form of plates 69 entered into circular arc recesses 71 in the table and having their upper surfaces flush with that of the table. These plates are carried by extensions 73 of the table which have rims or flanges 75 which meet the rim 5 of the table, and in effect are continuations thereof. The plates are fast on stub shafts 77 journalled in bearings in the table. One of these stub shafts is driven by a sprocket wheel 79 thereon connected by a sprocket chain 81 with a sprocket wheel 83 on the scraper bar drive shaft 41. The other stub shaft is driven by a sprocket wheel 85 thereon connected by a sprocket chain 87 with a sprocket wheel 89 on the shaft 41.

At opposite sides of each of the disks and carried by the table are a shelf 91 for supporting uncoated centers and a shelf 93 for supporting the glazed paper covered trays for receiving the coated centers.

In the practice of the process, hot liquid chocolate or other coating is conducted from the kettle through the pipes 13 and 15 to the surface 3 of the table, and preferably at a point adjacent the center thereof, and the chocolate will spread in a layer or stream over said surface. One of the series of scrapers may be set to work the chocolate toward, and the other set of scrapers may be set to work the chocolate from the center of the table. In the present instance, the series of stirrers 35 are at an angle of 45° with relation to the bar 39 and will work the chocolate away from the center, and the series of scrapers 37 are at an angle of 30° with relation to the bar and will work the chocolate toward the center. The consequence is that with the scraper carrier rotating in a contra-clockwise direction (Fig. 1), the resultant effect will be to feed the chocolate from the center outwardly. These scrapers will plow through the chocolate and thoroughly mix and stir the same and remove bubbles therefrom. The presence of bubbles in the coating heretofore has been a serious objection.

The chocolate fed outwardly by the scrapers is delivered to the plates 69 at the hand dipping stations in sufficient amount and speed to accommodate the dippers. The disks are slowly rotated so that the dippers will have opportunity to perform the dipping operations. Chocolate is not only continuously supplied to these plates, but is continuously removed therefrom and carried back to the table surface where it is picked up by the scrapers and mixed with the chocolate on the table. Thus, it is impossible for a crust of chocolate to build up at the dipper's station, and the old step of removing crust from the dipper's shelf to be re-melted is eliminated.

To obtain a superior gloss on the chocolate coating, the temperature thereof on delivery to the table should be around 100 or 110° F., and it is tempered and brought down to a temperature of about 84° F. on the table. It is then brought up to about 86° F., and this is accomplished on the plates at the hand dipping stations. To this end they are equipped with cooling jackets 95 through which water or other cooling fluid is circulated. These jackets are separate from the table water jacket 19, the construction being such that differential temperatures may be had in the table and plate jackets according to conditions as required.

It is also desirable that steam may be applied to the plate jackets 95 to melt any residual chocolate on the plates and facilitate cleaning thereof. To supply either water or steam thereto, pipes 97 are connected with the jackets 95 and T-unions 99. Water pipes 101 are connected to the unions 99 and provided with valves 103, and steam pipes 105 are connected to the unions and provided with valves 107. The water or steam leaves the jackets through pipes 108. When it is desired to supply water to the jackets, the valves 103 are opened, and the valves 107 are closed, and when it is desired to supply steam to the jackets, the valves 103 are closed, and the valves 107 are opened.

At the end of a day's operation, steam is admitted to the jackets to melt any residual chocolate on the table and plates, and the scrapers are set to feed the melted chocolate to a drain 109 (Fig. 1) provided with a valve 111. Or if desired, the valve 111 may remain closed, and the scrapers may be set to feed the melted chocolate to the pipe 15, and the chocolate may be drawn therethrough and through the pipe 13 on reversal of the pump which would be employed for pumping the chocolate to the table.

Referring now more particularly to Figs. 5 and 6, the apparatus shown therein comprises a series of tempering and dipping stations 113, each of which may be substantially the same as the tempering and dipping station already described. The chocolate may be melted in a large kettle or container 115. To conduct the hot liquid chocolate from the kettle to the stations, a main pipe 117 is provided extending from the kettle past the stations, at each of which is a branch pipe 119 communicating with the surface of the table and provided with a valve 121. A pump 123 of usual construction feeds the chocolate from the kettle to the stations, and the amount or rate of feed thereto may be controlled by adjustment of the valves 121. Continuing from the main pipe 117 is a return pipe 125 which is connected with a union 127. A short pipe 129 connects the union with the tank, and also connected to the union is a discharge pipe 131. The union is provided with a valve 133, the construction being such that the valve may be adjusted to allow chocolate to drain back into the kettle or discharge through the pipe 131. The shafts for rotating the scraper carriers may be driven by bevel gears 135 thereon meshing with bevel gears 137 on a main shaft 139 extending through the base of the kettle. A pulley 141 on this shaft is connected by a belt 143 with an electric motor 145. Each of the shafts 41 may be provided with a clutch 147 to control starting and stopping of the scraper carriers.

To carry empty trays to the tempering and coating stations, and to carry filled trays therefrom through a sufficient travel to enable cooling and hardening of the chocolate coating on the centers, a conveyer 149 may be provided of any suitable construction, and desirably similar to the conveyer shown in Letters Patent No. 1,321,520, granted to Jesse W. Greer, November 11, 1919.

The conveyer will have its lower run conveniently within the reach of the dippers, so that when trays have been filled at the dipping stations, they may be transferred therefrom to the conveyer, and an empty tray can be removed from the conveyer, the filled tray taking the place of the empty tray on the conveyer. The filled trays will pass through the several runs of the conveyer, and finally reach the discharge point 151 where they are removed and ready for packing.

By this invention a process and apparatus are provided enabling centers to be hand dipped more rapidly and at less expense than heretofore, and a superior product is produced.

While the invention has been described more particularly with respect to coating centers with chocolate, other coating material might be used.

It will be understood that the invention is not limited to the specific embodiment shown, and that various deviations may be made therefrom without departing from the spirit and scope of the appended claims.

What is claimed is:

1. A candy coating apparatus comprising, in combination, a table, means for feeding liquid coating thereto, a confectionery hand dipping station located closely adjacent to said table and independent of the table, and means for continuously stirring and mixing the coating on said table and for feeding the coating from the table to said station and from the station back to said table.

2. A candy coating apparatus comprising, in combination, a table, means for feeding liquid coating thereto, a confectionery hand dipping station located closely adjacent to said table and independent of the table, and rotary scrapers for stirring and mixing the coating on said table and for feeding the coating from said table to said station.

3. A candy coating apparatus comprising, in combination, a table, means for feeding liquid coating thereto, a rotary plate located close to said table and serving as a confectionery hand dipping station, and means for stirring and mixing the coating on said table and feeding said coating on to said rotary plate.

4. A candy coating apparatus comprising, in combination, a table for receiving liquid coating, a circular plate positioned horizontally closely adjacent to said table and serving as a hand dipping station, means for feeding the coating from said table on to said plate, and mechanism for rotating said plate about approximately its own center.

5. A candy coating apparatus comprising, in combination, a table for receiving liquid coating, said table having a recess in the top thereof, a rotary horizontal plate set into said recess, means for stirring and mixing the coating and for feeding the same to said plate, and means for rotating said plate about a vertical axis extending through the plate.

6. A candy coating apparatus comprising, in combination, a table for receiving a liquid coating, said table having a recess in the top thereof, a rotary circular horizontal plate set into said recess with its upper surface substantially flush with the surface of said table, means for rotating said plate about approximately its own center, and rotary scraping means arranged to stir and mix the coating on said table and to feed it to said plate.

7. A candy coating apparatus comprising, in combination, a table for receiving liquid coating, a water jacket for the table, rotary plates at opposite sides of said table serving as confectionery hand dipping stations, a shaft, a carrier on the shaft having scrapers for stirring and mixing the coating on said table and for feeding the same to the plates, and means driven by said shaft for rotating said plates.

8. A candy coating apparatus comprising, in combination, a table for receiving liquid coating, a plate positioned closely adjacent to said table and serving as a hand dipping station, means for feeding the coating from said table on to said plate, separate jackets for the table and plate, and means for conducting fluids to said jackets whereby fluids at different temperatures may be supplied to said jackets.

9. A candy coating apparatus comprising, in combination, a container for liquid coating, a table, piping for conducting the coating from the container to the surface of said table, means for stirring and mixing the coating on said table, a jacket for the table, means for selectively supplying either a cooling or a heating fluid to said jacket at the will of the operator, and return piping for conducting liquid coating from said table back to said container.

10. That improvement in processes of coating confectionery centers which consists in feeding liquid coating material on to the upper surface of a table, stirring and mixing the coating on said table to temper the coating, feeding the coating so tempered to a hand dipping station located closely adjacent to the table, and maintaining the coating at said station moving in a direction independent of the motion of the coating material on the table.

11. That improvement in processes of coating confectionery centers which consists in continuously feeding hot liquid coating material to the upper surface of a table, stirring, cooling and mixing the coating on said surface to temper the coating, feeding the coating so tempered approximately continuously to a hand dipping station, maintaining the coating at said station in motion independent of the motion of the coating material on the table, and returning unused coating from said station to said table before the coating can form a crust.

12. That improvement in processes of coating confectionery centers which consists in continuously feeding liquid coating material to the upper surface of a table, stirring and mixing the coating on said surface to temper the coating, feeding the coating so tempered approximately continuously to a hand dipping station, maintaining the coating at said station in motion independent of the motion of the coating material on the table, feeding unused coating from said station back to said table approximately continuously, and maintaining the temperature of said coating at said station within approximately predetermined limits.

JESSE W. GREER.
FRED W. GREER.